United States Patent
Hirai et al.

(10) Patent No.: US 7,020,122 B1
(45) Date of Patent: Mar. 28, 2006

(54) CDMA SYSTEM MOBILE RADIO TERMINAL EQUIPMENT

(75) Inventors: Katsumi Hirai, Inagi (JP); Masayuki Enoki, Hino (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/623,137

(22) PCT Filed: Dec. 24, 1999

(86) PCT No.: PCT/JP99/07294

§ 371 (c)(1),
(2), (4) Date: Aug. 28, 2000

(87) PCT Pub. No.: WO00/41335

PCT Pub. Date: Jul. 13, 2000

(30) Foreign Application Priority Data

Dec. 28, 1998 (JP) .................. 10-373382

(51) Int. Cl.
*H04B 7/00* (2006.01)
(52) U.S. Cl. .................................... 370/342
(58) Field of Classification Search ................ 370/310, 370/328, 329, 331, 342
See application file for complete search history.

(56) References Cited

U.S. PATENT DOCUMENTS 5,940,452 A * 8/1999 Rich ........................... 375/347
6,212,368 B1 * 4/2001 Ramesh et al. .......... 455/277.2

FOREIGN PATENT DOCUMENTS

| JP | 49-124902 | 11/1974 |
|----|-----------|---------|
| JP | 06-284062 | 10/1994 |
| JP | 07-087057 | 3/1995 |
| JP | 07-231278 | 8/1995 |
| JP | 08-88593 | 4/1996 |
| JP | 09-284208 | 10/1997 |
| JP | 10-117157 | 5/1998 |
| JP | 10-215238 | 8/1998 |
| KR | 96-9459 | * 7/1996 |
| KR | 1996-0009459 | 7/1996 |
| KR | 98-79852 | * 11/1998 |
| KR | 1998-079852 | 11/1998 |

OTHER PUBLICATIONS

Kim et al. Pilot Power Control and Service Coverage Support in CDMA Mobile Systems. IEEE. May 16-20, 1999. pp. 1464-1468.*

(Continued)

*Primary Examiner*—Chi Pham
*Assistant Examiner*—Derrick W Ferris
(74) *Attorney, Agent, or Firm*—Finnegan, Henderson, Farabow, Garrett & Dunner, L.L.P.

(57) ABSTRACT

According to the present invention, one antenna (10b) receives a signal, and a handoff determination means (100a) monitors Ec/Io obtained by a searcher (16a) and determines whether a handoff condition is met or not. When the handoff condition is met, a switching control means (100b) switches the antenna used for reception to the other remaining antenna (18) to receive a signal. When a further handoff condition is met or only when a handoff condition is met in response to signals received by the two antennas (10 and 18), handoff control is performed.

6 Claims, 6 Drawing Sheets

OTHER PUBLICATIONS

Japanese Office Action mailed Nov. 30, 2004 and its English translation.

Notification of Reasons for Rejection from Japanese Patent Office Mailed on Mar. 15, 2005, in Japanese Patent Application No. 10-373382.

* cited by examiner

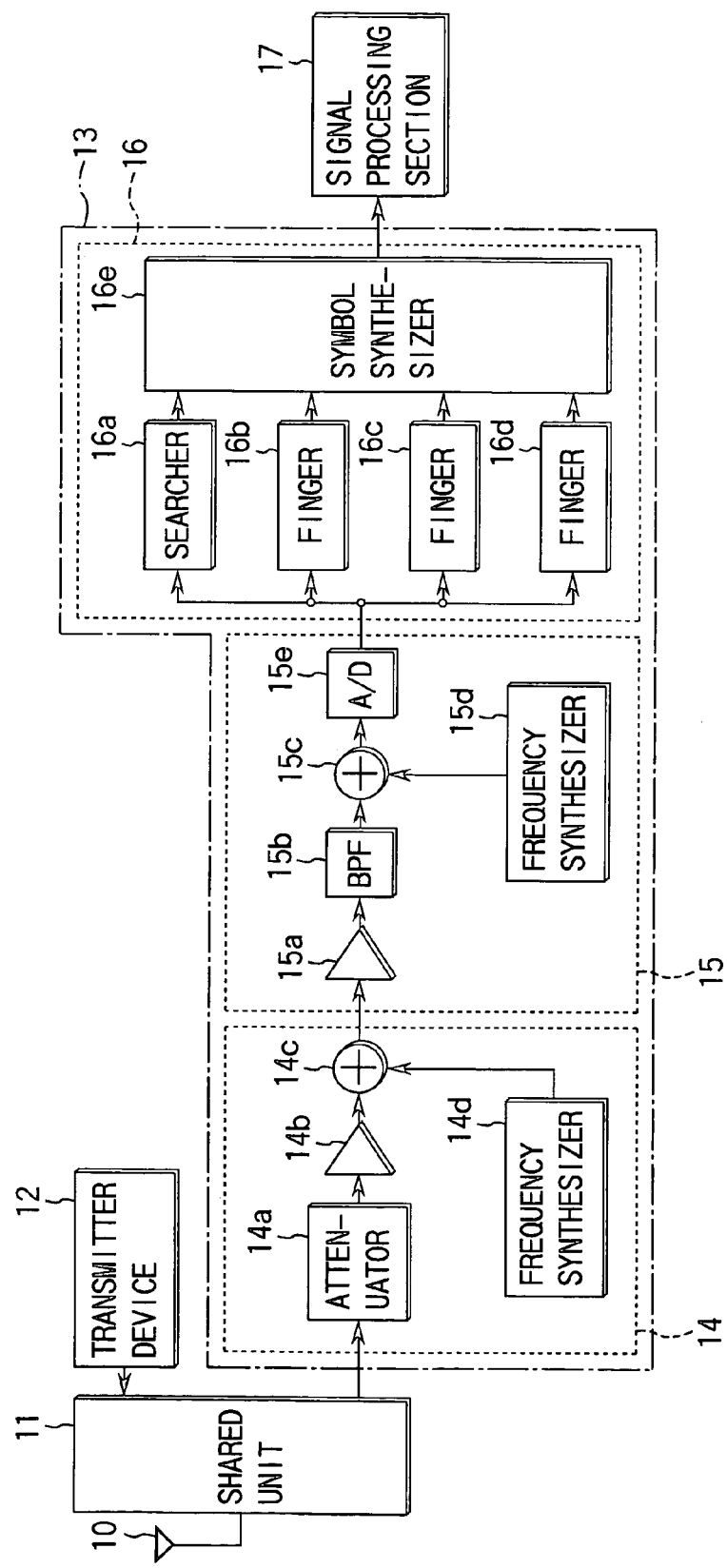
F I G. 1

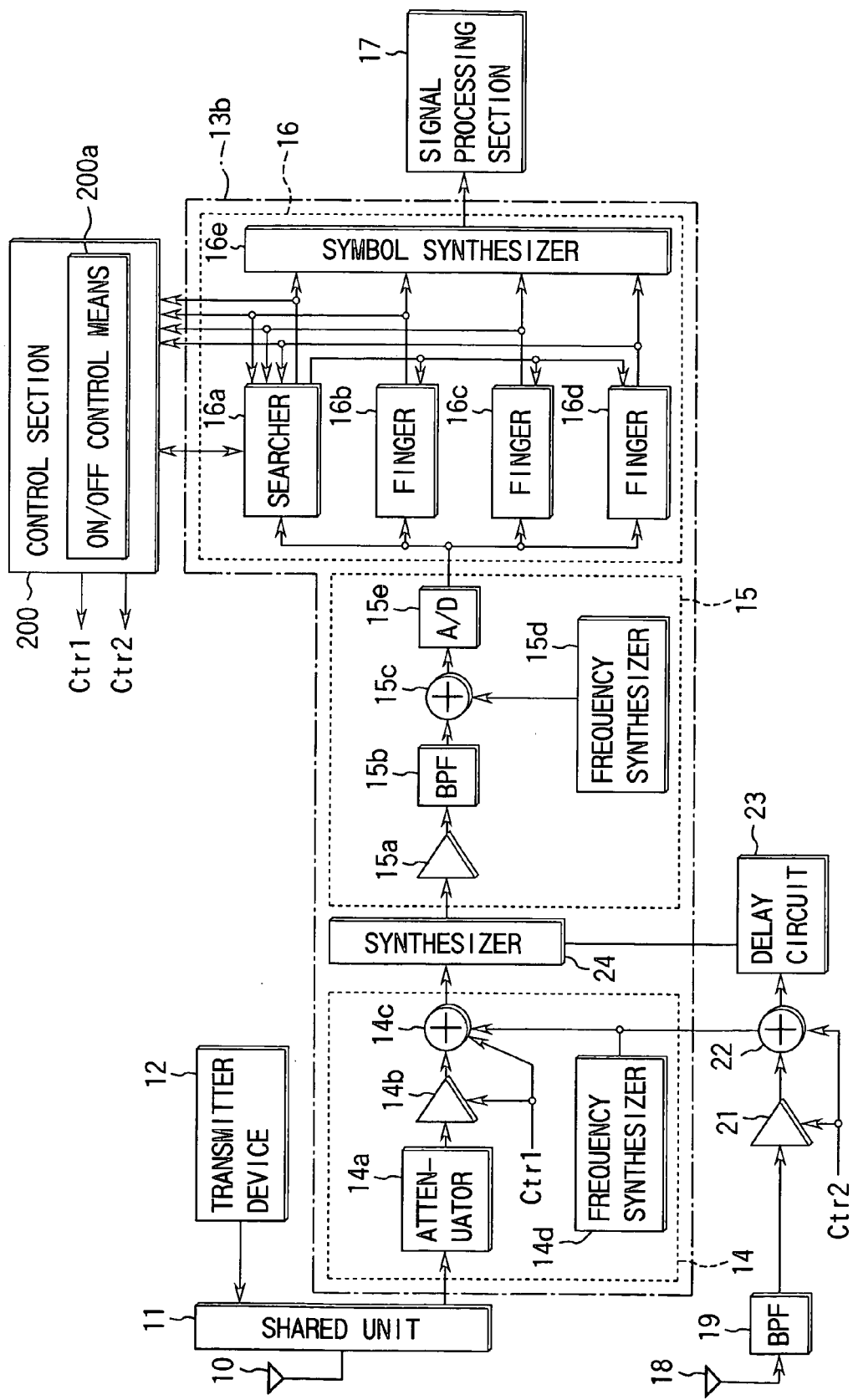
F I G. 5

US 7,020,122 B1

CDMA SYSTEM MOBILE RADIO TERMINAL EQUIPMENT

TECHNICAL FIELD

The present invention relates to CDMA (Code Division Multiple Access) system mobile radio terminal equipment for use in a mobile radio communication system such as a car phone system and a cellular phone system.

BACKGROUND ART

As is commonly known, a mobile radio communication system adopting a CDMA system has recently received attention. This system introduces a spread spectrum communication system as a communication system.

Prior art mobile radio terminal equipment of the above mobile radio communication system will now be described with reference to FIG. 1. The equipment will be explained here with a particular emphasis on a receiving system according to the present invention.

In a transmitter device 12, transmission data such as digitized voice and data is modulated by a digital modulation method such as PSK modulation, and the modulated data is converted into a wideband baseband signal using a spreading code. The spread signal is then up-converted into a radio-frequency signal and input to a first antenna 10 through a shared unit 11. The above signal is radiated from the first antenna 10 into space and transmitted toward a base station not shown.

A radio signal transmitted from the above base station is received by the first antenna 10 and input to a receiver device 13 through the shared unit 11. The receiver device 13 includes a radio circuit 14, an intermediate-frequency circuit 15, and a Rake receiver 16.

First, in the radio circuit 14, a radio signal received from the shared unit 11 is input to an attenuator 14a and attenuated herein by a preset amount. The signal passing through the attenuator 14a is amplified to a predetermined level by an amplifier 14b and then mixed with a signal, which is generated by a frequency synthesizer 14d, by a mixer 14c. The mixed signal is down-converted into an intermediate-frequency signal.

The intermediate-frequency signal is input to the intermediate-frequency circuit 15 and amplified to a predetermined level by the amplifier 15a. The amplification result only in a desired band passes through a band-pass filter (BPF) 15b and is mixed with a signal, which is generated by a frequency synthesizer 15d, by a mixer 15c. The mixed signal is converted into a baseband signal, and the baseband signal is converted into a digital signal by an A/D converter (A/D) 15e and input to the Rake receiver 16.

The Rake receiver 16 includes a searcher 16a, fingers 16b, 16c and 16d, and a symbol synthesizer 16e, and the above digital signal is input to the searcher 16a and the fingers 16b, 16c and 16d.

The searcher 16a detects signals coming to its own terminal from the base station through a plurality of routes, i.e., a so-called multipath, and de-spreads them using the same spreading code as used for spreading on the transmitter side. Then, Ec/Io (Io indicates energy of all received signals and Ec represents a signal level of a desired wave) is obtained for each of de-spreading effects, and a delay time difference (a delay profile) between them is obtained. Based on these, reception timing (de-spreading timing) of the multipath is determined and assigned to the fingers 16b, 16c and 16d.

The fingers 16b, 16c and 16d de-spread the above digital signal using the same spreading code as used for spreading on the transmitter side at the de-spreading timing assigned by the searcher 16a.

The symbol synthesizer 16e synthesizes the symbols of multipath components de-spread by the fingers 16b, 16c and 16d in consideration of the de-spreading timing assigned to each of the fingers 16b, 16c and 16d.

The signal having a symbol synthesized by the symbol synthesizer 16e is demodulated in a signal processing section 17 in the post-stage in accordance with the digital modulation on the transmitter side, and reception data is reproduced accordingly.

Further, in the mobile radio terminal equipment, a control section, not shown, performs control for a handoff in accordance with the Ec/Io of a pilot signal obtained by the searcher 16a.

When a signal is received intermittently in a standby state, the control section measures Ec/Io of a pilot signal from another base station to perform a handoff if the following conditions are satisfied: (1) the above Ec/Io becomes lower than a prescribed value; (2) the Ec/Io becomes the prescribed value lower than that in the last reception; and (3) a difference in Ec/Io between adjacent base stations falls within the prescribed value. When the Ec/Io of the pilot signal from another base station is larger than the prescribed value, a handoff is performed for another base station.

In a call state of the mobile radio terminal equipment, when Ec/Io of a pilot signal of a base station currently connected thereto becomes lower than the prescribed value and Ec/Io of a pilot signal of an adjacent base station becomes larger than the prescribed value, a handoff is carried out while communicating with a plurality of base stations including a base station satisfying a given condition.

However, the multipath resolution of the searcher 16a is a reciprocal of a chip rate in the prior art CDMA system mobile radio terminal equipment. If, therefore, a delay time of the multipath is smaller than the reciprocal, the multipath components are separated in the fingers 16b, 16c and 16d as described above and thus the symbols thereof cannot be synthesized.

In other words, if the delay time of the multipath is short, there occurs a problem in which Rake reception cannot be performed and a phasing-resistant property is decreased to make it impossible to secure a stable communication quality. The problem is caused in low-speed movement such as a walk and in a stationary state more markedly than in high-speed movement.

If, under the above circumstances where no Rake reception can be performed because of a short delay time of multipath, multipath phasing occurs to make Ec/Io of a pilot signal from the current base station lower than a prescribed value even for the time being, processing for a handoff will be started.

Since the Rake reception cannot be carried out depending on conditions for which the above phasing occurs, a handoff will be performed for a distant base station though the current base station is nearer at hand. Since, in this case, a sufficient signal level cannot be obtained stably from the base station after the handoff, a phenomenon occurs in which a handoff is performed again for the base station before the handoff.

Such a useless operation remarkably consumes a battery current. Even though a handoff is not performed after all, it is necessary to search for a base station for a handoff in response to a pilot signal from another base station in order to determine whether the handoff is performed or not; accordingly, the same problem of uselessly consuming a battery current occurs.

In the CDMA system, Ec/Io of a signal from each base station cannot be specified until the respective sections in RF, IF and BB bands are operated for comparison of the Ec/Io; therefore, the power consumption becomes higher and the above problem becomes more serious than in another system such as a PDC (Personal Digital Cellar) system in which an RSSI unit measures the strength of a signal received from each base station.

DISCLOSURE OF INVENTION

The present invention has been developed to resolve the above problem and its object is to provide CDMA system movable radio terminal equipment capable of inhibiting power of a battery from dissipating by preventing processing for acquiring another radio base station, such as processing for performing an unnecessary handoff, even though multipath phasing occurs under the circumstance where no Rake reception can be performed because of a short delay time of multipath.

Another object of the present invention is to provide CDMA system mobile radio terminal equipment capable of securing stable communication quality even when a delay time of multipath is short.

In order to attain the above objects, the present invention provides mobile radio terminal equipment radio-connected to a plurality of radio base stations connectable to a communication network by a CDMA system to allow communications with a communication station on the communication network, comprising two antennas, antenna selection means for selecting one of the two antennas as an antenna for use, and handoff control means for switching an antenna currently selected by the antenna selection means to a remaining antenna to receive a signal when a handoff condition is met in an incoming-call standby mode and then switching the remaining antenna to the original antenna to perform handoff processing again when a further handoff condition is met.

The present invention also provides mobile radio terminal equipment radio-connected to a plurality of radio base stations connectable to a communication network by a CDMA system to allow communications with a communication station on the communication network, comprising two antennas, antenna selection means for selecting one of the two antennas as an antenna for use, and handoff control means for switching an antenna currently selected by the antenna selection means to a remaining antenna to receive a signal when a handoff condition is met in a communications mode and then switching the remaining antenna to the original antenna to perform handoff processing again when a further handoff condition is met.

In the CDMA system mobile radio terminal equipment having the above structure, when a handoff condition is met in an incoming-call standby mode or a communications mode, an antenna currently selected by the antenna selection means is switched to the remaining antenna to receive a signal. When a further handoff condition is met, the remaining antenna is switched to the original antenna again to perform handoff processing.

In other words, even if multipath phasing occurs to temporarily require handoff processing under circumstances where Rake reception cannot be performed because of a short delay time of multipath, one antenna is switched to the other antenna to receive a signal, and it is verified whether the above processing need to be performed. In accordance with the verification result, the processing is performed.

Consequently, according to the CDMA system mobile radio terminal equipment having the above structure, processing for an unnecessary handoff is prevented and power of a battery can be inhibited from dissipating.

In order to attain the above objects, the present invention also provides mobile radio terminal equipment radio-connected to a plurality of radio base stations connectable to a communication network by a CDMA (Code Division Multiple Access) system to allow communications with a communication station on the communication network, comprising a first antenna capable of transmitting and receiving a signal, a second antenna used for receiving a signal, and reception means for converting a signal received by the second antenna into an intermediate-frequency signal and then delaying the intermediate-frequency signal, synthesizing the delayed signal and an intermediate-frequency signal into which a signal received by the first antenna is converted, and performing Rake reception using a synthetic result for demodulation.

In the CDMA system mobile radio terminal equipment having the above structure, the signals received by two antennas are down-converted into intermediate-frequency signals, and one of the signals is delayed and synthesized with the other signal, thereby performing Rake reception by the synthesized signal.

Consequently, according to the CDMA system mobile radio terminal equipment having the above structure, Rake reception can be performed even when a delay time of multipath is short, so that stable communication quality can be secured.

BRIEF DESCRIPTION OF DRAWINGS

FIG. 1 is a circuit block diagram showing the structure of prior art mobile radio terminal equipment;

FIG. 5 is a circuit block diagram showing the structure of CDMA system mobile radio terminal equipment according to a second embodiment of the present invention.

BEST MODE FOR CARRYING OUT THE INVENTION

Hereinafter embodiments of the present invention will be described with reference to the drawings.

Figure 2:
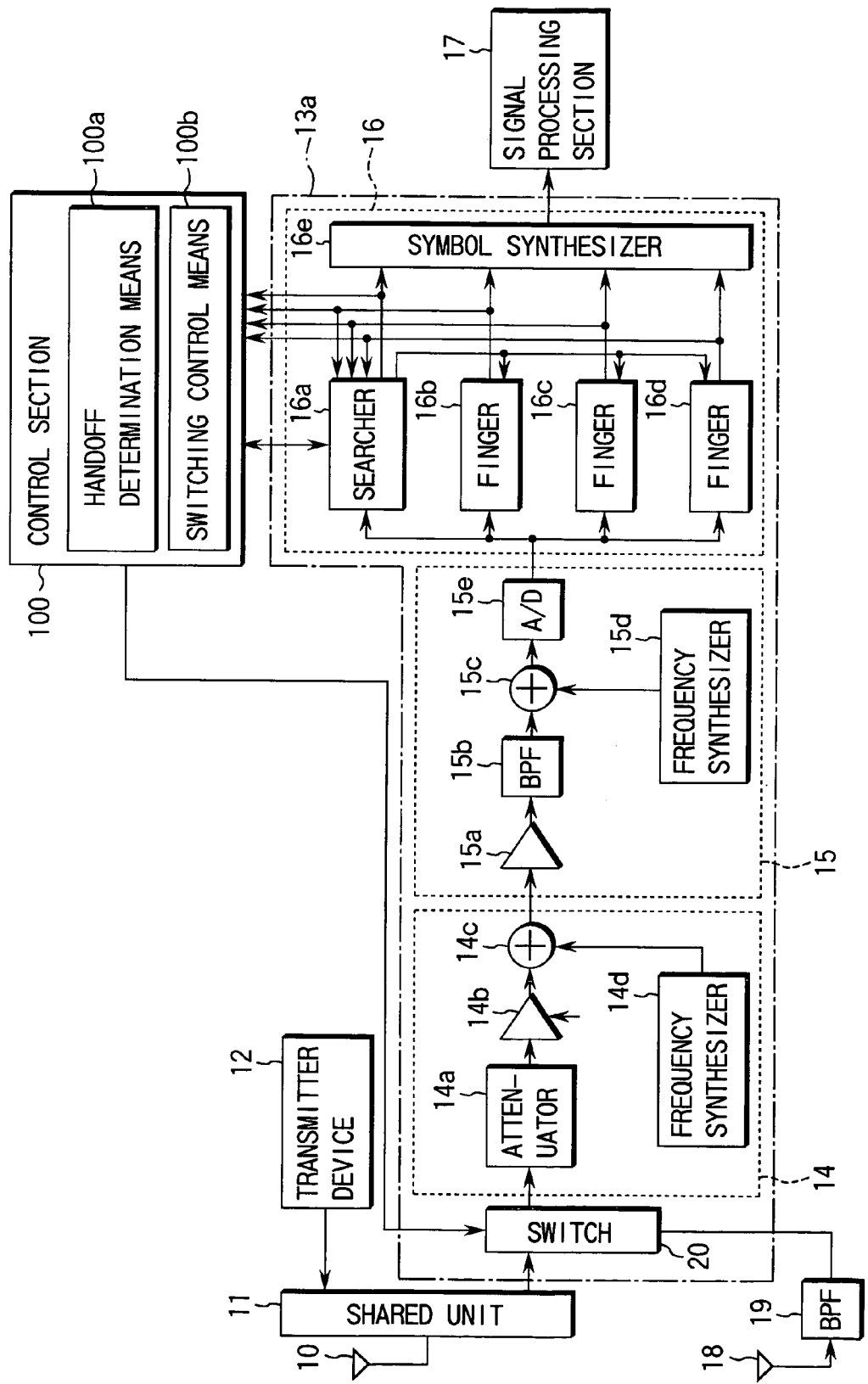
FIG. 2 is a circuit block diagram showing the structure of CDMA system mobile radio terminal equipment according to a first embodiment of the present invention.

FIG. 2 illustrates the structure of CDMA system mobile radio terminal equipment according to a first embodiment of the present invention. In FIG. 2, the same portions as those of the prior art CDMA system mobile radio terminal equipment shown in FIG. 1 are denoted by the same signs, and the equipment of the first embodiment will be explained here with a particular emphasis on a receiving system according to the present invention.

In a transmitter device 12, transmission data such as digitized voice and data is modulated by a digital modulation method such as PSK modulation, and the modulated data is converted into a wideband baseband signal using a spreading code. The spread signal is then up-converted into a radio-frequency signal and input to a first antenna 10 through a shared unit 11. The above signal is radiated from the first antenna 10 into space and transmitted toward a base station not shown.

A radio signal transmitted from the above base station is received by the first antenna 10 and input to a receiver device 13a through the shared unit 11. The receiver device 13a includes a switch 20, a radio circuit 14, an intermediate-frequency circuit 15, and a Rake receiver 16.

First, the switch 20 is supplied with a reception signal input from the shared unit 11 and a reception signal which is received by a second antenna 18 and restricted in a desired band by a bandpass filter (BPF) 19, and its switching operation is controlled by a control section 100, which will be described later, to supply one of the above two reception signals to the radio circuit 14.

The second antenna 18 is provided inside a housing of the mobile radio terminal equipment.

In the radio circuit 14, a radio signal received from the shared unit 11 is input to an attenuator 14a and attenuated herein by a preset amount. The signal passing through the attenuator 14a is amplified to a predetermined level by an amplifier 14b and then mixed with a local oscillation signal, which is generated by a frequency synthesizer 14d, by a mixer 14c. The mixed signal is down-converted into an intermediate-frequency signal.

The down-converted intermediate-frequency signal is input to the intermediate-frequency circuit 15 and amplified to a predetermined level by the amplifier 15a. The amplification result only in a desired band passes through a bandpass filter (BPF) 15b and is mixed with a signal, which is generated by a frequency synthesizer 15d, by a mixer 15c. The mixed signal is converted into a baseband signal, and the baseband signal is converted into a digital signal by an A/D converter (A/D) 15e and input to the Rake receiver 16.

The Rake receiver 16 includes a searcher 16a, fingers 16b, 16c and 16d, and a symbol synthesizer 16e, and the above digital signal is input to the searcher 16a and the fingers 16b, 16c and 16d.

The searcher 16a detects signals coming to its own terminal from the base station through a plurality of routes, i.e., a so-called multipath, and de-spreads them using the same spreading code as used for spreading on the transmitter side. Then, Ec/Io is obtained for each of de-spreading effects, and a delay time difference (a delay profile) between them is obtained. Based on these, reception timing (de-spreading timing) of the multipath is determined and assigned to the fingers 16b, 16c and 16d.

The fingers 16b, 16c and 16d de-spread the above digital signal using the same spreading code as used for spreading on the transmitter side at the de-spreading timing assigned by the searcher 16a.

The symbol synthesizer 16e synthesizes the symbols of multipath components de-spread by the fingers 16b, 16c and 16d in consideration of the de-spreading timing assigned to each of the fingers 16b, 16c and 16d.

The signal having a symbol synthesized by the symbol synthesizer 16e is demodulated in a signal processing section 17 in the post-stage in accordance with the digital modulation on the transmitter side, and reception data is reproduced accordingly.

A control section 100 includes a CPU, a ROM and a RAM. The CPU centralizes and controls respective sections of the mobile radio terminal equipment in accordance with control programs and control data stored in the ROM and, for example, it performs control on a handoff.

The control section 100 also includes a handoff determination means 100a and a switching control means 100b in order to fulfill a new control function.

The handoff determination means 100a monitors the Ec/Io obtained by the above searcher 16a and determines whether a handoff condition is met or not.

The switching control means 100b controls switching of the switch 20 in accordance with a determination result of the handoff determination means 100a.

Though not shown, there is a power supply section having a battery for supplying power for operating the above-described sections, as a constituting element of the present equipment.

Figure 3:
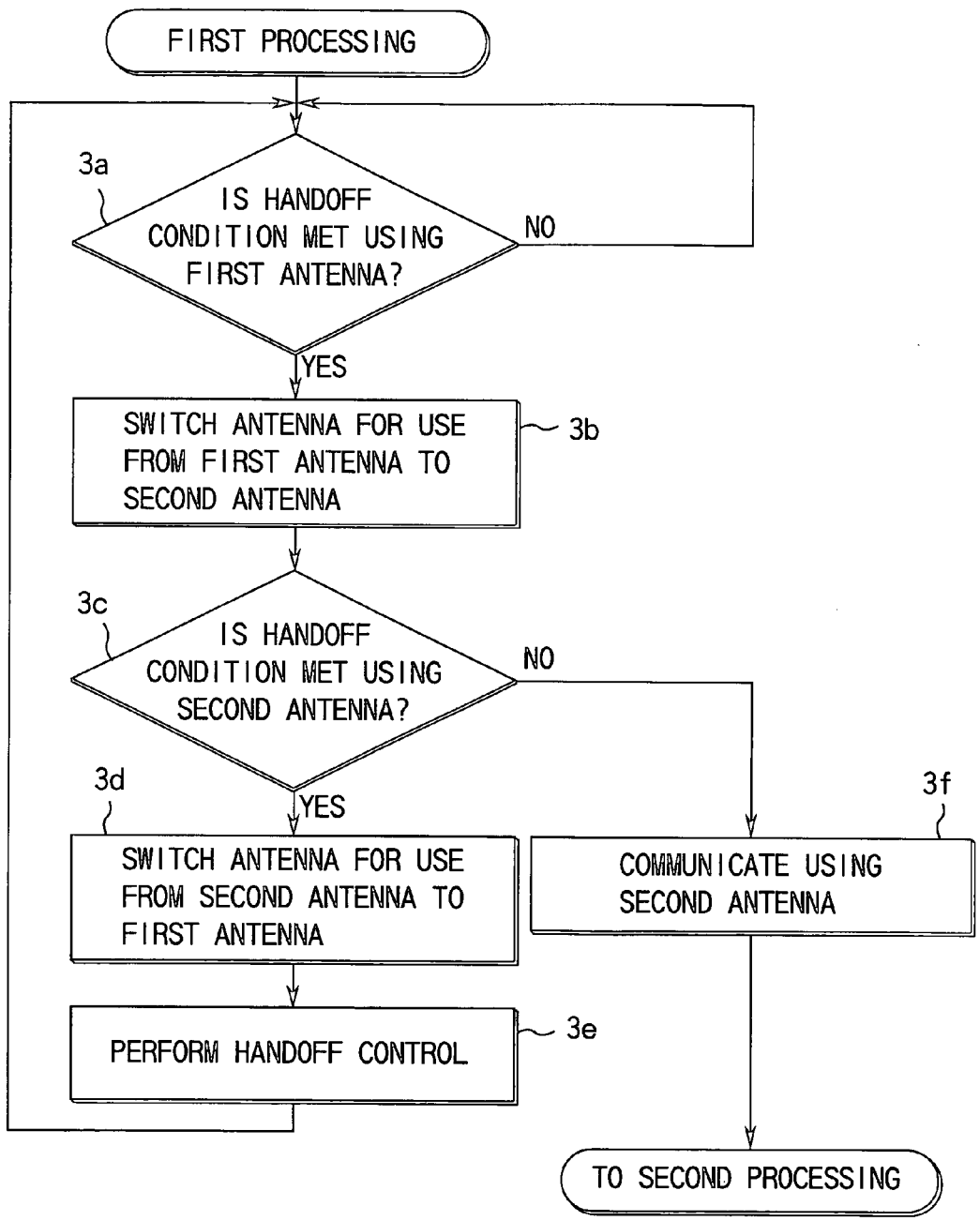
FIG. 3 is a flowchart of control performed when a handoff condition of the CDMA system mobile radio terminal equipment shown in FIG. 2 is met.
Figure 4:
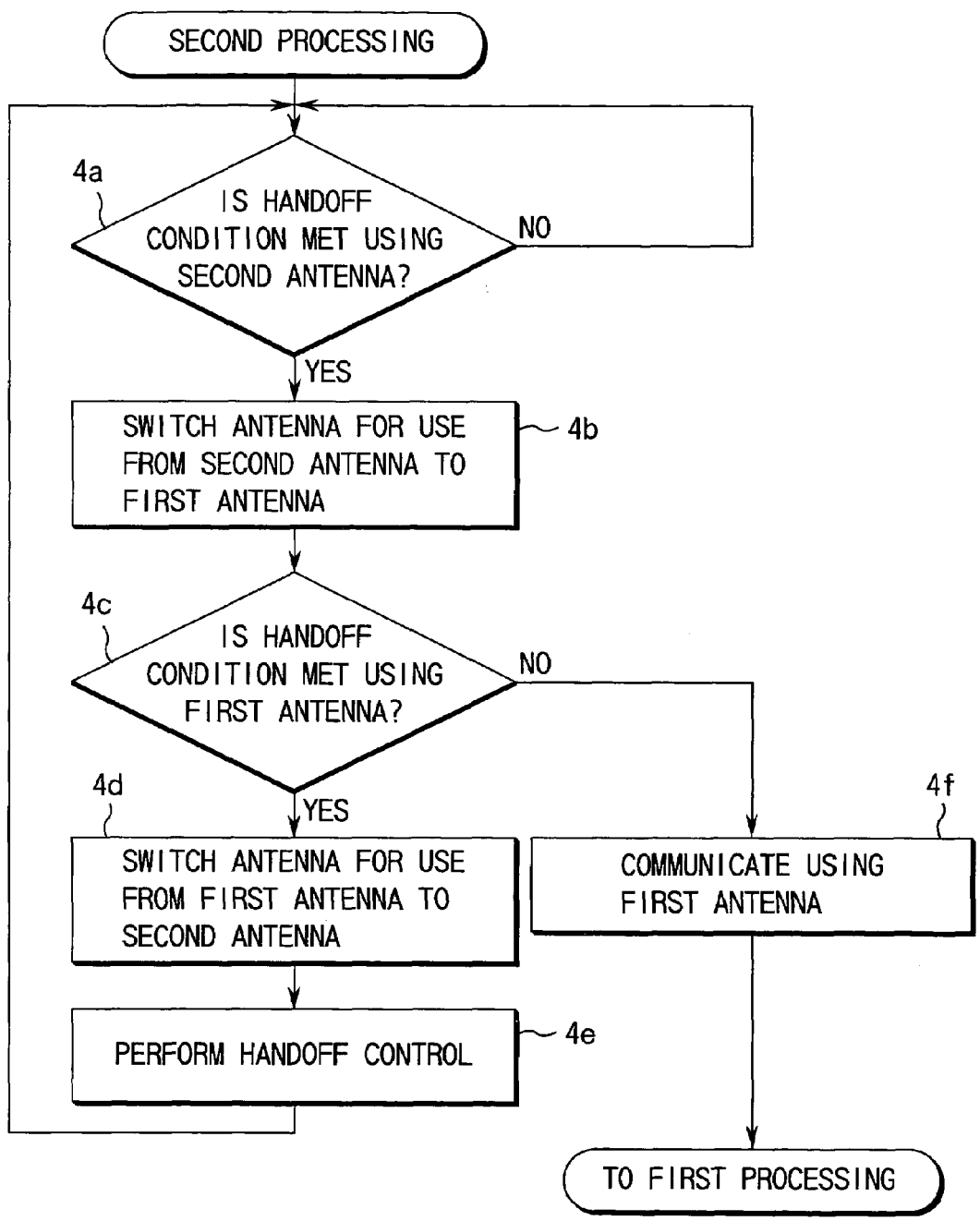
FIG. 4 is a flowchart of control performed when a handoff condition of the CDMA system mobile radio terminal equipment shown in FIG. 2 is met.

A control operation performed when a handoff condition is met in a standby mode of the CDMA mobile radio terminal equipment having the above structure, will now be explained. FIGS. 3 and 4 are flowcharts each showing control performed by the control section 100 when a handoff condition is met. These control operations are performed alternately and, in an early stage of the operations, e.g., at power-on, they start in sequence from the first processing shown in FIG. 3.

The processing shown in FIG. 3 starts from the state in which a signal is received through the first antenna 10.

First, in step 3a, the handoff determination means 100a monitors the Ec/Io obtained by the searcher 16a and determines whether a handoff condition is met or not in the signal received through the first antenna 10. If the handoff condition is met, the step shifts to step 3b and, if not, it shifts to step 3a again.

In step 3b, the switching control means 100b controls switching of the switch 20 to connect the second antenna 18 to the attenuator 14a through the bandpass filter 19 in place of the first antenna 10 which has been connected thereto through the shared unit 11. Then, the step moves to step 3c.

In step 3c, the handoff determination means 100a determines whether the handoff condition is still met or not in a signal received through the second antenna 18 started in step 3b. If the handoff condition is satisfied in this step, too, the step moves to step 3d and, if not, it moves to step 3f.

In step 3d, the switching control means 100b controls switching of the switch 20 to connect the first antenna 10 to the attenuator 14a through the shared unit 11 in place of the second antenna 18 which has been connected thereto through the bandpass filter 19. Then, the step shifts to step 3e, in which normal handoff control is performed, and the step shifts to step 3a again.

Since the handoff condition is not satisfied in the signal received through the second antenna 18, the signal is continuously received through the second antenna 18 in step 3f. This processing is completed and advances to the next second processing.

The second processing shown in FIG. 4 starts from the state in which a signal is received through the second antenna 18.

First, in step 4a, the handoff determination means 100a monitors the Ec/Io obtained by the searcher 16a and determines whether a handoff condition is met or not in the signal received through the second antenna 18. If the handoff condition is met, the step shifts to step 4b and, if not, it shifts to step 4a again.

In step 4*b*, the switching control means 100*b* controls switching of the switch 20 to connect the first antenna 10 to the attenuator 14*a* through the shared unit 11 in place of the second antenna 18 which has been connected thereto through the bandpass filter 19. Then, the step moves to step 4*c*.

In step 4*c*, the handoff determination means 100*a* determines whether the handoff condition is still met or not in a signal received through the first antenna 10 started in step 4*b*. If the handoff condition is satisfied in this step, too, the step moves to step 4*d* and, if not, it moves to step 4*f*.

In step 4*d*, the switching control means 100*b* controls switching of the switch 20 to connect the second antenna 18 to the attenuator 14*a* through the bandpass filter 19 in place of the first antenna 10 which has been connected thereto through the shared unit 11. Then, the step shifts to step 4*e*, in which normal handoff control is performed, and the step shifts to step 4*a* again.

Since the handoff condition is not satisfied in the signal received through the first antenna 10, the signal is continuously received through the first antenna 10 in step 4*f*. This processing is completed and advances to the above first processing.

As described above, the CDMA system mobile radio terminal equipment having the above structure includes two antennas 10 and 18. Even though a handoff condition is met in a signal received through one of the antennas, it is not met in a signal received through the remaining other antenna. In other words, the handoff control is not performed unless the handoff condition is met in both signals received through the two antennas.

Consequently, according to the CDMA system mobile radio terminal equipment having the above structure, even if a handoff condition is satisfied by multipath phasing caused under circumstances where Rake reception cannot be performed because of a short delay time of multipath when a signal is received by one of the antennas, the handoff control is not always performed. For this reason, processing for an unnecessary handoff is prevented and power of a battery can be inhibited from dissipating.

Next, the structure of a CDMA system mobile radio terminal equipment according to a second embodiment of the present invention will be explained.

FIG. 5 illustrates the structure of the CDMA system mobile radio terminal equipment according to the above second embodiment. In FIG. 5, the same portions as those of the prior art CDMA system mobile radio terminal equipment shown in FIG. 1 are denoted by the same signs, and the equipment of the second embodiment will be explained here with a particular emphasis on a receiving system according to the present invention.

In a transmitter device 12, transmission data such as digitized voice and data is modulated by a digital modulation method such as PSK modulation, and the modulated data is converted into a wideband baseband signal using a spreading code. The spread signal is then up-converted into a radio-frequency signal and input to a first antenna 10 through a shared unit 11. The above signal is radiated from the first antenna 10 into space and transmitted toward a base station not shown.

A radio signal transmitted from the above base station is received by the first antenna 10 and input to a receiver device 13*b* through the shared unit 11. The receiver device 13*b* includes a radio circuit 14, a synthesizer 24, an intermediate-frequency circuit 15, and a Rake receiver 16.

In the radio circuit 14, a radio signal received from the shared unit 11 is input to an attenuator 14*a* and attenuated herein by a preset amount. The signal passing through the attenuator 14*a* is amplified to a predetermined level by an amplifier 14*b* and then mixed with a local oscillation signal, which is generated by a frequency synthesizer 14*d*, by a mixer 14*c*. The mixed signal is down-converted into an intermediate-frequency signal. The amplifier 14*b* and mixer 14*c* are turned on/off in response to a common control signal Ctr1 from a control section 200 which will be described later.

The signal down-converted to the intermediate-frequency signal by the mixer 14*c*, is input to the synthesizer 24. The above local oscillation signal is supplied to a mixer 22 which will be described later.

The signal received by the second antenna 18 is restricted in a desired band by a bandpass filter (BPF) 19. The second antenna 18 is provided inside a housing of the mobile radio terminal equipment.

The amplifier 21 is turned on/off in response to a control signal Ctr2 from the control section which will be described later to amplify the strength of the signal, whose band is restricted by the bandpass filter 19, to a predetermined level.

Like the amplifier 21, the mixer 22 is turned off in response to the control signal Ctr2 from the control section 200, and an amplification result of the amplifier 21 is mixed with the local oscillation signal generated by the frequency synthesizer 14*d* and down-converted into an intermediate-frequency signal. This intermediate-frequency signal is delayed by given time t in a delay circuit 23 and input to the synthesizer 24.

In response to an instruction from the control section 200 which will be described later, the synthesizer 24 synthesizes the intermediate-frequency signal obtained by the radio circuit 14 and the intermediate-frequency signal from the delay circuit 23 and outputs the synthesized signal to the intermediate-frequency circuit 15 or selectively outputs one of the above intermediate-frequency signals to the intermediate-frequency circuit 15.

In the intermediate-frequency circuit 15, an amplifier 15*a* amplifies a synthesis result of the synthesizer 24 to a predetermined level. The amplification result only in a desired band passes through a band-pass filter (BPF) 15*b* and is mixed with a signal, which is generated by a frequency synthesizer 15*d*, by a mixer 15*c*. The mixed signal is converted into a baseband signal, and the baseband signal is converted into a digital signal by an A/D converter (A/D) 15*e* and input to the Rake receiver 16.

The Rake receiver 16 includes a searcher 16*a*, fingers 16*b*, 16*c* and 16*d*, and a symbol synthesizer 16*e*, and the above digital signal is input to the searcher 16*a* and the fingers 16*b*, 16*c* and 16*d*.

The searcher 16*a* detects signals coming to its own terminal from the base station through a plurality of routes, i.e., a so-called multipath, and de-spreads them using the same spreading code as used for spreading on the transmitter side. Then, Ec/Io is obtained for each of de-spreading effects, and a delay time difference (a delay profile) between them is obtained. Based on these, reception timing (de-spreading timing) of the multipath is determined and assigned to the fingers 16*b*, 16*c* and 16*d* in accordance with an assignment executing instruction from the control section which will be described later.

The fingers 16*b*, 16*c* and 16*d* de-spread the above digital signal using the same spreading code as used for spreading on the transmitter side at the de-spreading timing assigned by the searcher 16*a*.

The symbol synthesizer 16*e* synthesizes the symbols of multipath components de-spread by the fingers 16*b*, 16*c* and 16*d* in consideration of the de-spreading timing assigned to each of the fingers 16*b*, 16*c* and 16*d*.

The signal having a symbol synthesized by the symbol synthesizer 16*e* is demodulated in a signal processing section 17 in the post-stage in accordance with the digital modulation on the transmitter side, and reception data is reproduced accordingly.

The control section 200 includes a CPU, a ROM and a RAM. The CPU centralizes and controls respective sections of the mobile radio terminal equipment in accordance with control programs and control data stored in the ROM and, for example, it performs control on a handoff.

The control section 200 also includes an ON/OFF control means 200*a* in order to fulfill a new control function.

The ON/OFF control means 200*a* monitors each of outputs of the searcher 16*a* and the fingers 16*b*, 16*c* and 16*d* to control an operation of each of the amplifiers 14*b* and 21 and mixers 14*c* and 22 and give an assignment executing instruction to the searcher 16*a*.

Though not shown, there is a power supply section having a battery for supplying power for operating the above-described sections, as a constituting element of the present equipment.

Figure 6:
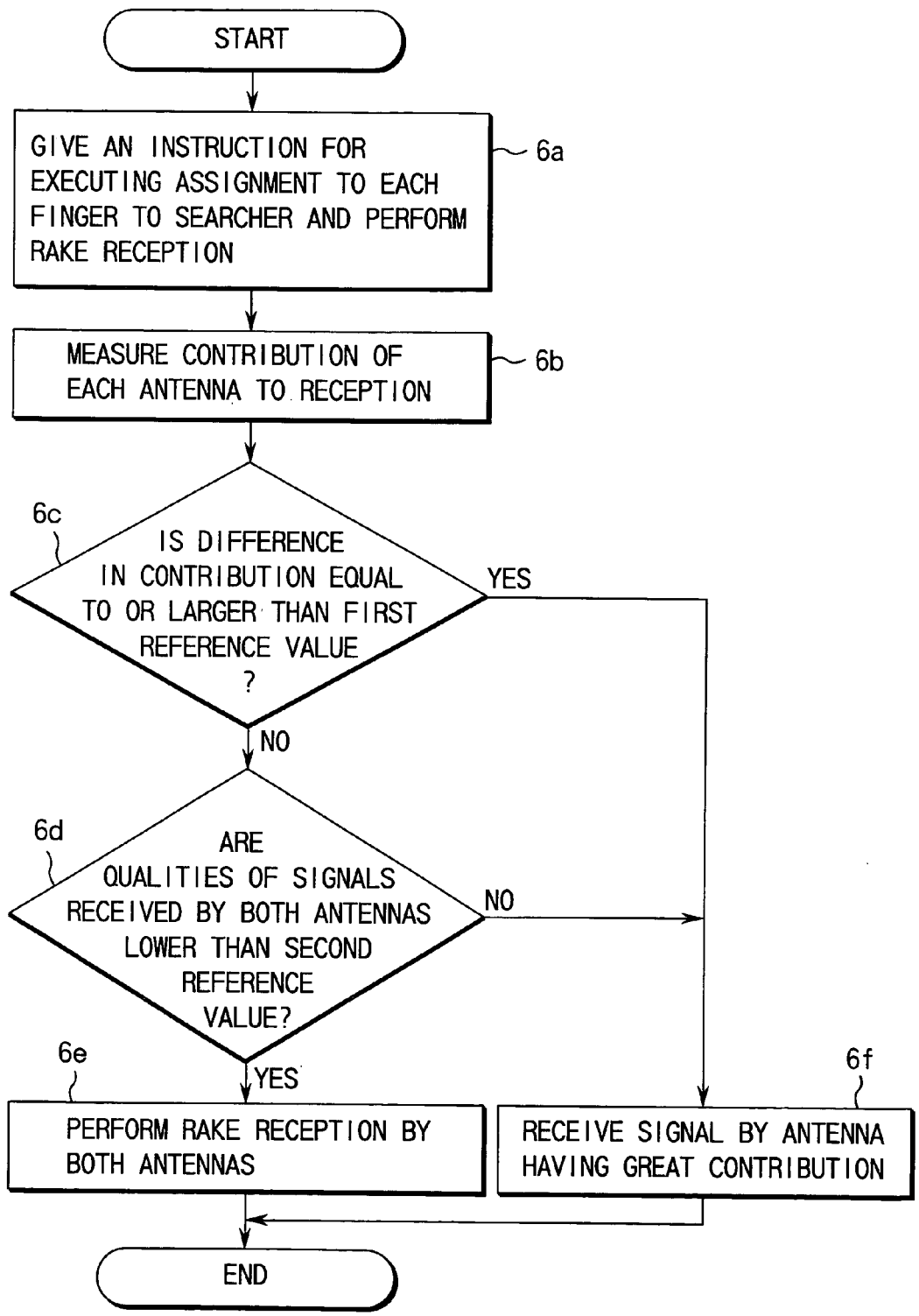
FIG. 6 is a flowchart of antenna switching control of the CDMA system mobile radio terminal equipment shown in FIG. 5.

An antenna switching control operation of the CDMA mobile radio terminal equipment having the above structure will now be explained. FIG. 6 is a flowchart showing antenna switching control performed by the above control section 200.

First, in step 6*a*, the amplifiers 14*b* and 21 and mixers 14*c* and 22 are operated to cause the synthesizer 24 to synthesize signals received through the first and second antennas 10 and 18 and give an assignment executing instruction to the searcher 16*a*.

In contrast, the searcher 16*a* obtains a delay profile and, based on this delay profile, assigns the finger 16*b* timing at which a signal received by the first antenna 10 is received (de-spread) and also assigns the finger 16*c* timing at which a signal received by the second antenna 18 is received (de-spread).

Thus, the finger 16*b* de-spreads the signal received by the first antenna 10, while the finger 16*c* de-spreads the signal received by the second antenna 18. In other words, Rake reception is performed by both the signals received by the first and second antennas 10 and 18.

Then, in step 6*b*, Ec/Io of each of de-spreading effects of the fingers 16*b* and 16*c* is monitored. It is determined how much the signals received by the first and second antennas 10 and 18 contribute to an improvement in reception quality, and the step advances to step 6*c*.

In step 6*c*, it is determined whether a difference in contribution between the signal received by the first antenna 10 and the signal received by the second antenna 18, e.g., a difference in Ec/Io is smaller than a first reference value. If the difference is smaller than the first reference value, the step shifts to step 6*d* and, if it is not smaller than the first reference value, the step shifts to step 6*f*.

In step 6*d*, it is determined whether Ec/Io of the signal received by the first antenna 10 and Ec/Io of the signal received by the second antenna 18 are both smaller than a second reference value. If both are smaller than the second reference value, the step moves to step 6*e* and, if Ec/Io of at least one of the signals is not smaller than the second reference value, the step shifts to step 6*f*.

In step 6*e*, the amplifiers 14*b* and 21 and mixers 14*c* and 22 are controlled by the control signals Ctr1 and Ctr2 such that their operations are continued, and the synthesizer 24 is caused to synthesize the signals received through the above antennas 10 and 18. The reception using two antennas 10 and 18 is therefore continued.

On the other hand, in step 6*f*, only the amplifier (one of the amplifiers 14*b* and 21 and its corresponding mixer 14*c* or 22) of the antenna corresponding to a signal making a greater contribution is operated through the control signals Ctr1 and Ctr2 by comparing the above contributions of the signals received by the first antenna 10 and second antenna 18, e.g., Ec/Io of these signals.

In other words, the synthesizer 24 does not synthesize signals received from the reception systems on the above-operated side but supplies them to the amplifier 15*a*. Of the two antennas 10 and 18, when symbols of the reception signals of the two antennas are synthesized, only the antenna capable of receiving a signal making a larger contribution to its signal quality receives a signal.

As described above, the CDMA system mobile radio terminal equipment having the above structure includes two antennas 10 and 18. The signal received by one antenna 18 is converted into an intermediate-frequency signal and then delayed, while the signals received by both the antennas 10 and 18 are synthesized to perform Rake reception.

Consequently, according to the CDMA system mobile radio terminal equipment having the above structure, a delay time of multipath received by each of the antennas 10 and 18 is smaller than a chip rate and, even under the circumstances where no Rake reception can be performed by a signal received by each of the antennas, the Rake reception can be done by signals received by both the antennas 10 and 18.

Furthermore, according to the CDMA system mobile radio terminal equipment having the above structure, if, during the Rake reception using signals received by both the antennas 10 and 18, the contribution of a signal received by each of the antennas from each of outputs of the searcher 16*a* and fingers 16*b*, 16*c* and 16*d* is monitored and the reception can be performed sufficiently in response to the signal received by one antenna, this antenna receives a signal, while an amplifier (14*b* or 21 and its corresponding mixer 14*c* or 21) corresponding to the other antenna is stopped.

Therefore, according to the CDMA system mobile radio terminal equipment having the above structure, the reception signals of two antennas are used only when the reception quality is bad and signals are not unnecessarily received by two antennas, thus allowing power consumption to be saved.

The CDMA system is easily susceptible to an interference signal caused by nonlinearity of the radio circuit since a signal bandwidth is broad. The attenuator 14*a* is thus provided; however, if a strong interference signal is generated, the gain of the amplifier 14*b* has only to lower.

In the above-described embodiments, it is assumed that the second antenna 18 is provided in the housing of the mobile radio terminal equipment, so that its gain is lower than that of the first antenna 10. For this reason, no attenuators are employed in the radio circuit connected to the second antenna 18. In other words, when the gain of the second antenna 18 is equal to that of the first antenna 10, an attenuator has only to be applied.

The present invention is not limited to the above embodiments. It is needless to say that various modifications can be made without departing from the scope of the subject matter of the present invention.

What is claimed is:

1. Mobile radio terminal equipment radio-connectable to a plurality of radio base stations connected to a communication network by a CDMA (Code Division Multiple Access) system to allow communications with a communication station on the communication network, comprising:
   a first antenna and a second antenna;
   antenna selection means for selecting the first antenna as an antenna for use; and
   handoff control means for switching the first antenna selected by the antenna selection means to the second antenna to verify whether a handoff is needed when a handoff condition is met in an incoming-call standby mode and then switching the second antenna to the first, originally-selected antenna to perform handoff processing again when the necessity of the handoff is verified.

2. Mobile radio terminal equipment radio-connectable to a plurality of radio base stations connected to a communication network by a CDMA (Code Division Multiple Access) system to allow communications with a communication station on the communication network, comprising:
   a first antenna and a second antenna;
   antenna selection means for selecting the first antenna as an antenna for use; and
   handoff control means for switching the first antenna selected by the antenna selection means to the second antenna to verify whether a handoff is needed when a handoff condition is met in a communications mode and then switching the second antenna to the first, originally-selected antenna to perform handoff processing again when the necessity of the handoff is verified.

3. The mobile radio terminal equipment according to claim 2, wherein the first antenna is capable of transmitting and receiving a signal, and the second antenna is capable of receiving a signal.

4. The mobile radio terminal equipment according to claim 1, wherein the first antenna is capable of transmitting and receiving a signal, and the second antenna is capable of receiving a signal.

5. The mobile radio terminal equipment according to claim 1, wherein the second antenna is capable of transmitting and receiving a signal, and the first antenna is capable of receiving a signal.

6. The mobile radio terminal equipment according to claim 2, wherein the second antenna is capable of transmitting and receiving a signal, and the first antenna is capable of receiving a signal.

* * * * *